United States Patent
Maguire, III et al.

(10) Patent No.: US 6,529,217 B1
(45) Date of Patent: Mar. 4, 2003

(54) SYSTEM AND METHOD FOR GRAPHICALLY DISPLAYING A SET OF DATA FIELDS

(75) Inventors: Justin M. Maguire, III, Seattle, WA (US); David L. Stearns, Seattle, WA (US); Jeanell D. Sullivan, Carnation, WA (US); Andrew J. Verprauskus, Seattle, WA (US); Wenli Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,737

(22) Filed: Jun. 15, 1999

(51) Int. Cl.$^7$ .............................................. G09G 5/00
(52) U.S. Cl. .................... 345/769; 345/765; 345/440
(58) Field of Search ................... 345/769, 765, 345/835, 440, 866

(56) References Cited

U.S. PATENT DOCUMENTS

| | | | | |
|---|---|---|---|---|
| 5,461,708 A | * | 10/1995 | Kahn ........................ | 345/440 |
| 5,535,324 A | * | 7/1996 | Alvarez et al. ............. | 345/440 |
| 5,581,677 A | * | 12/1996 | Myers et al. ............... | 345/440 |
| 5,588,108 A | * | 12/1996 | Kumar et al. .............. | 345/765 |
| 5,619,631 A | * | 4/1997 | Schott ....................... | 345/440 |
| 5,768,578 A | * | 6/1998 | Kirk et al. ................. | 707/100 |
| 5,894,311 A | * | 4/1999 | Jackson ..................... | 345/440 |
| 6,075,530 A | * | 6/2000 | Lucas et al. ............... | 345/804 |
| 6,188,403 B1 | * | 2/2001 | Sacerdoti et al. .......... | 345/440 |
| 6,233,719 B1 | * | 5/2001 | Hardikar et al. ........... | 345/866 |
| 6,333,748 B1 | * | 12/2001 | Takiguchi et al. ......... | 345/589 |

* cited by examiner

*Primary Examiner*—Sy D. Luu
(74) *Attorney, Agent, or Firm*—Mark R. Hennings; Merchant & Gould (57) ABSTRACT

A method for graphically displaying a set of data fields includes creating a graphical display of a set of data fields through the use of icons and drop areas. To graphically display the data fields, a user first selects a range of data points, grouped into data fields, to be included in the graphical display. A list of icons corresponding to each of the data fields is then generated. A graph template is displayed, comprising a set of drop areas and a field list. The icons are displayed within the field list. Each drop area displays a watermark and may receive a number of icons. A user may drag and drop an icon from the field list into any one of the drop areas, which causes the data field associated with that icon to be graphically displayed in a manner dependent on the drop area.

22 Claims, 10 Drawing Sheets

Fig. 2.

| | A | B | C | D | E |
|---|---|---|---|---|---|
| 1 | Product D | Product F | Store Sale | Time | |
| 2 | Alcoholic | Drink | 11000 | 1997 | |
| 3 | Beverages | Drink | 29000 | 1997 | |
| 4 | Dairy | Drink | 9000 | 1997 | |
| 5 | Baked | Food | 17000 | 1997 | |
| 6 | Baking | Food | 40000 | 1997 | |
| 7 | Breakfast | Food | 8000 | 1997 | |
| 8 | Canned | Food | 40000 | 1997 | |
| 9 | Canned | Food | 4000 | 1997 | |
| 10 | Dairy | Food | 31000 | 1997 | |
| 11 | Deli | Food | 26000 | 1997 | |
| 12 | Eggs | Food | 10000 | 1997 | |
| 13 | Frozen | Food | 56000 | 1997 | |
| 14 | Meat | Food | 5000 | 1997 | |
| 15 | Produce | Food | 82000 | 1997 | |
| 16 | Snack | Food | 69000 | 1997 | |
| 17 | Snacks | Food | 13000 | 1997 | |
| 18 | Starchy | Food | 11000 | 1997 | |
| 19 | Carousel | Non-Cons | 1000 | 1997 | |
| 20 | Checkout | Non-Cons | 3000 | 1997 | |
| 21 | Health and | Non-Cons | 31000 | 1997 | |
| 22 | Household | Non-Cons | 61000 | 1997 | |
| 23 | Periodicals | Non-Cons | 9000 | 1997 | |

COLUMN CHART

*Fig. 4B.*

BAR CHART

*Fig. 4C.*

PIE CHART

SYSTEM AND METHOD FOR GRAPHICALLY DISPLAYING A SET OF DATA FIELDS

TECHNICAL FIELD

The present invention relates to graphically displaying data fields, and is more particularly directed to creating a graph through the use of an improved user interface containing icons representing data fields, drop areas, and enhanced user feedback.

BACKGROUND OF THE INVENTION

Spreadsheet programs are a useful tool in performing computational tasks such as keeping household budgets, work schedules, tracking bank accounts, maintaining inventories, and so on. As the use of personal computers within the home and business environments becomes more common, so too does the use of the spreadsheet program. The versatility of spreadsheet applications and the ease with which they are adapted to various tasks has resulted in their widespread use. With ongoing advances in the speed and capabilities of personal computers, enhanced features have been developed for spreadsheet programs.

Most spreadsheet and data management programs allow a user to create a graph of data points organized into data fields. Typically, a table displaying the interrelationships between various data fields must first be created. Next, the chart or graph is created, using this table as its basis. This necessitates first creating the table from the spreadsheet data, and then mapping the table to the chart. This method adds an additional level of abstraction to the chart creation process, leading to both increased modeling time on the part of the user and additional user confusion as the intermediate step is confronted. Thus, there is a need for a method of graphically displaying data fields that minimizes user input time and confusion.

Further, the traditional method for creating a chart often leads to graphing irregularities as the underlying data is modified, in part due to the additional level of abstraction between the data and the chart. Oftentimes, this renders the resulting chart unreadable. Therefore, there is also a need for a method of creating a graph from that allows a user to directly manipulate data fields on the graph itself, rather than relying on abstracting the data from an underlying table.

Most data management and manipulation programs give minimal feedback when a user is creating a graph of a set of data fields. This often leads to confusion on the part of a user as to the consequences of his actions, and may further lead to user error in graphing data fields. Thus, there is a further need for enhanced user feedback when creating a graphical display of data fields.

SUMMARY OF THE INVENTION

The invention is a system and a method for graphically displaying data by creating a graph with the use of a graphical user interface (GUI) containing icons representing data fields, drop areas displayed on the surface of a graph template, and enhanced user feedback. The invention allows a user to drag and drop data fields within a graph template containing several drop areas. A user may drag icons indicating various fields, or categories of data, directly onto these drop areas. As data fields are dropped on the various drop areas, the data is automatically charted on the graphical display. Further, as data fields are dropped in series or category drop areas, the axes of the graph template are automatically updated to reflect the new series or category fields. These drop areas change size and position depending on the type of graph being constructed. This keeps the drop area next to the axis on which the data field's items would be placed. Additionally, the graph template may be changed at any time during or after the graph creation process, thus allowing a user to alter the graphical display at will.

To enhance user feedback, text watermarks are visible within the drop areas. These watermarks indicate what types of fields should be dropped in each drop zone. For example, the series drop zone watermark reads: "Drop More Series Fields Here." This allows a user to easily and quickly comprehend the purpose of each drop area, as well as what effect will occur when dropping a specific data field into a specific drop area.

To further enhance user feedback, a variety of cursors are employed. The cursor changes shape depending on its current position in the graph template. As the cursor passes across a drop area, it changes shape to resemble the layout of the graph template. Additionally, the portion of the template corresponding to the drop area over which the cursor hovers is shaded. Thus, a user will know which drop area is underneath the cursor simply by looking at the cursor shape and coloring.

Finally, a user of the invention may easily reorder fields within an axis. The user simply clicks on the field he desires to move and drags the field to its new position. As a user interface enhancement, the cursor changes to an I-bar shape as the field is moved, thus showing a user exactly where the field will be placed if dropped. This allows a user to easily determine precise field placement when reordering fields along an axis.

DETAILED DESCRIPTION

The present invention is directed to a system and method for graphically displaying a set of data fields. In an exemplary embodiment, the invention is incorporated into the Microsoft EXCEL program, which is one of the applications in the Microsoft OFFICE application suite, as a PivotChart module. EXCEL and OFFICE are produced and distributed by Microsoft Corporation of Redmond, Wash. Briefly described, Microsoft OFFICE is a suite of application programs commonly used by both home and business users, and EXCEL is a spreadsheet and data manipulation program. In general, spreadsheet programs allow a user to enter and manipulate data, as well as display data in a tabular format. It is often desirable to graphically display this data. A PivotChart module allows a user to graphically display and manipulate data. The capabilities of the present invention, specifically the graphical display capabilities, will be described in greater detail herein below with respect to FIGS. 1–9, wherein like elements are represented by like numerals throughout the several figures.

Figure 1:
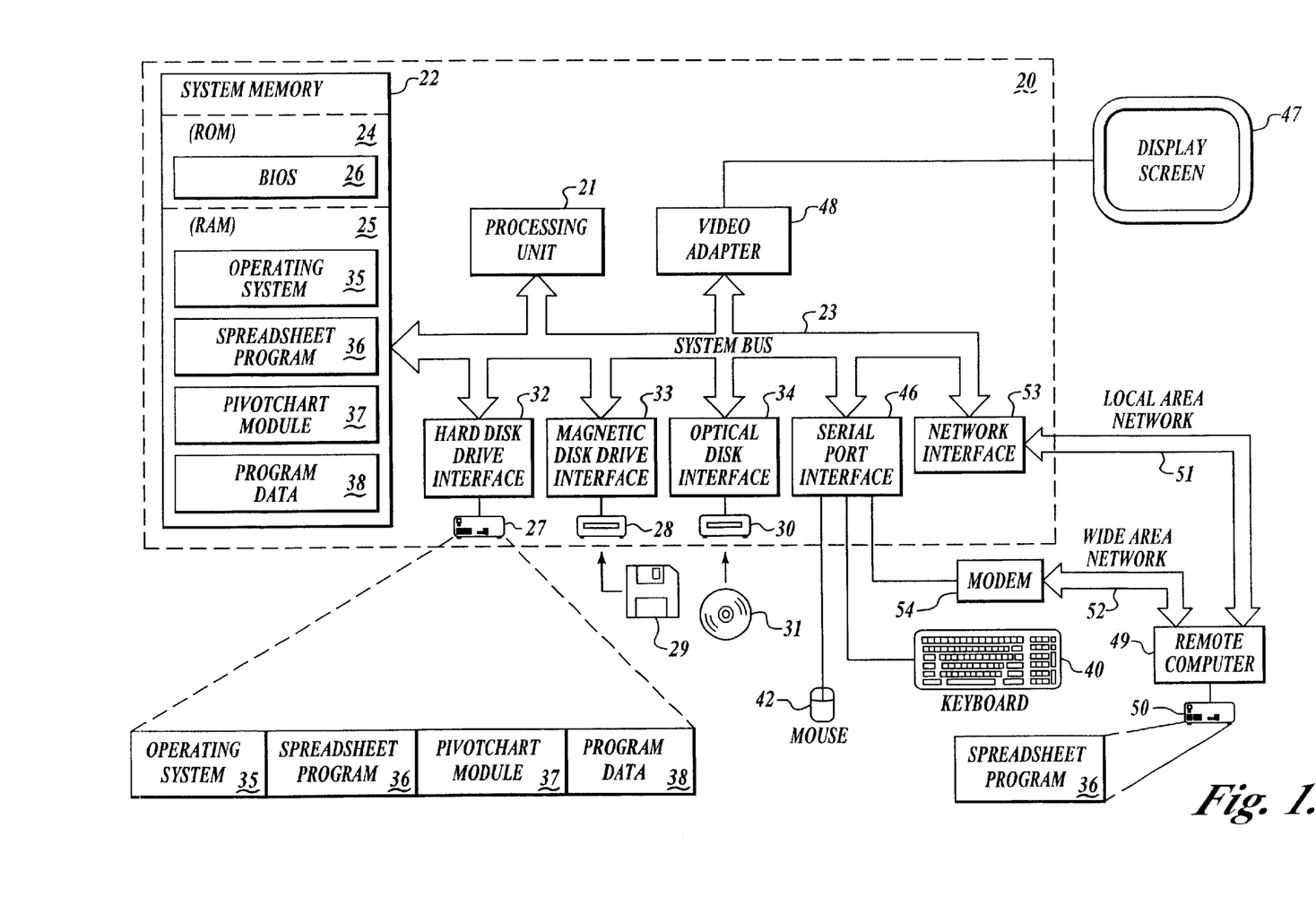
FIG. 1 is a block diagram of a personal computer that provides an exemplary operating environment for an exemplary embodiment of the present invention.

Now turning to FIG. 1, an exemplary operating environment in accordance with the exemplary embodiment of the present invention is now described.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, and so on that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs such as a database program 36, a PivotChart module 37, and program data 38. A user may enter commands and information into the personal computer 20 through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Exemplary Method for Graphically Displaying a Set of Data Fields

FIGS. 2 through 7 illustrate screen displays that depict a process by which a user may graphically display data fields comprised of data points. In an exemplary embodiment, these data fields may be represented by rows or columns in a chart.

Figure 2:
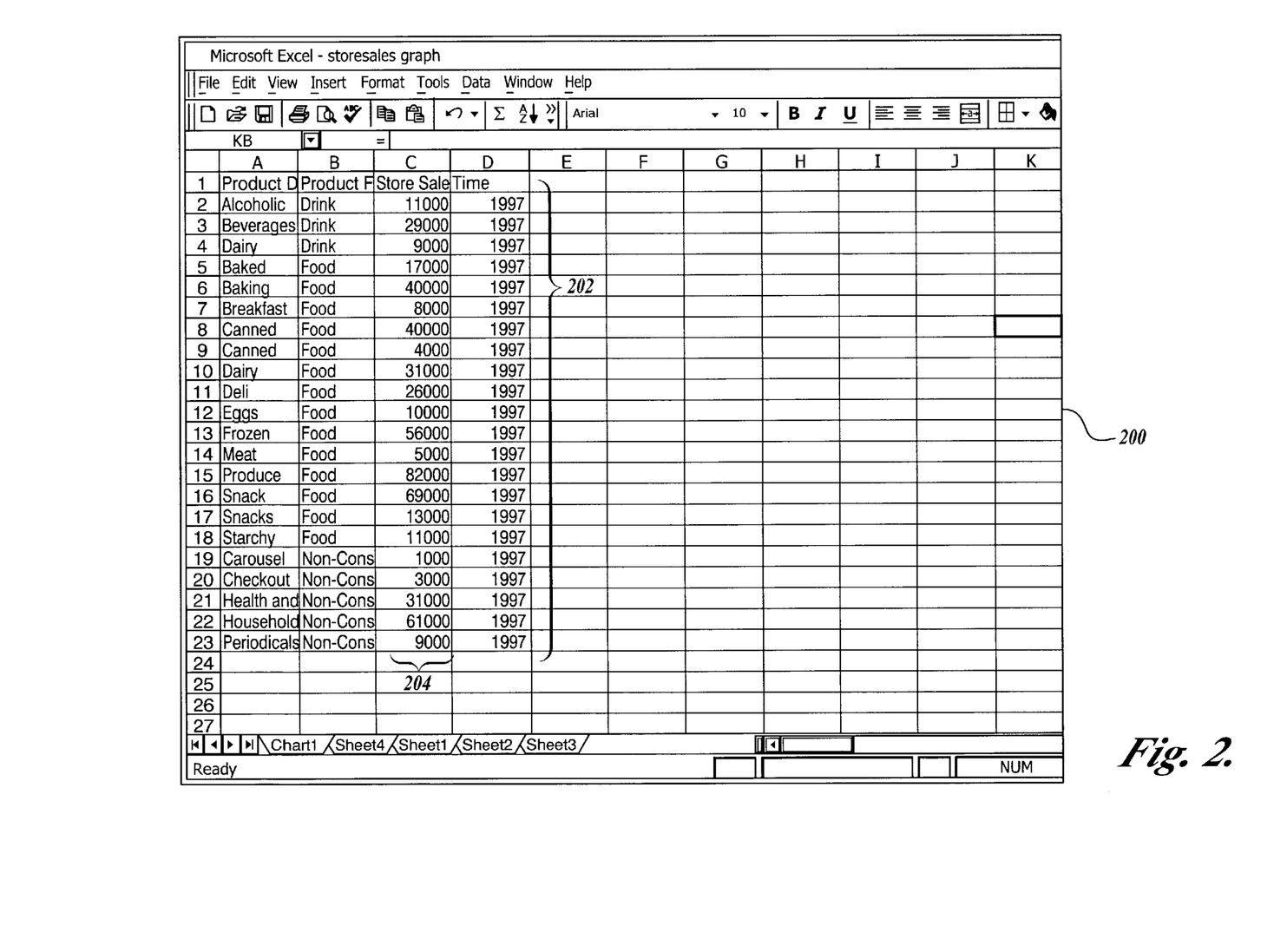
FIG. 2 is a screen display illustrating a range of data points and data fields in accordance with an exemplary embodiment of the present invention.

FIG. 2 depicts a portion of a typical spreadsheet. The spreadsheetwindow 200 contains multiple data points 204.

These data points 204 are organized into data fields 202, such as the "Time" data field, which occupies column D of the spreadsheetwindow 200. A user of an exemplary embodiment may select the range of data fields 202 that he desires to graphically display. Typically, this is done by highlighting or otherwise selecting the data fields 202 through the use of an input device such as a mouse 42.

Figure 3:
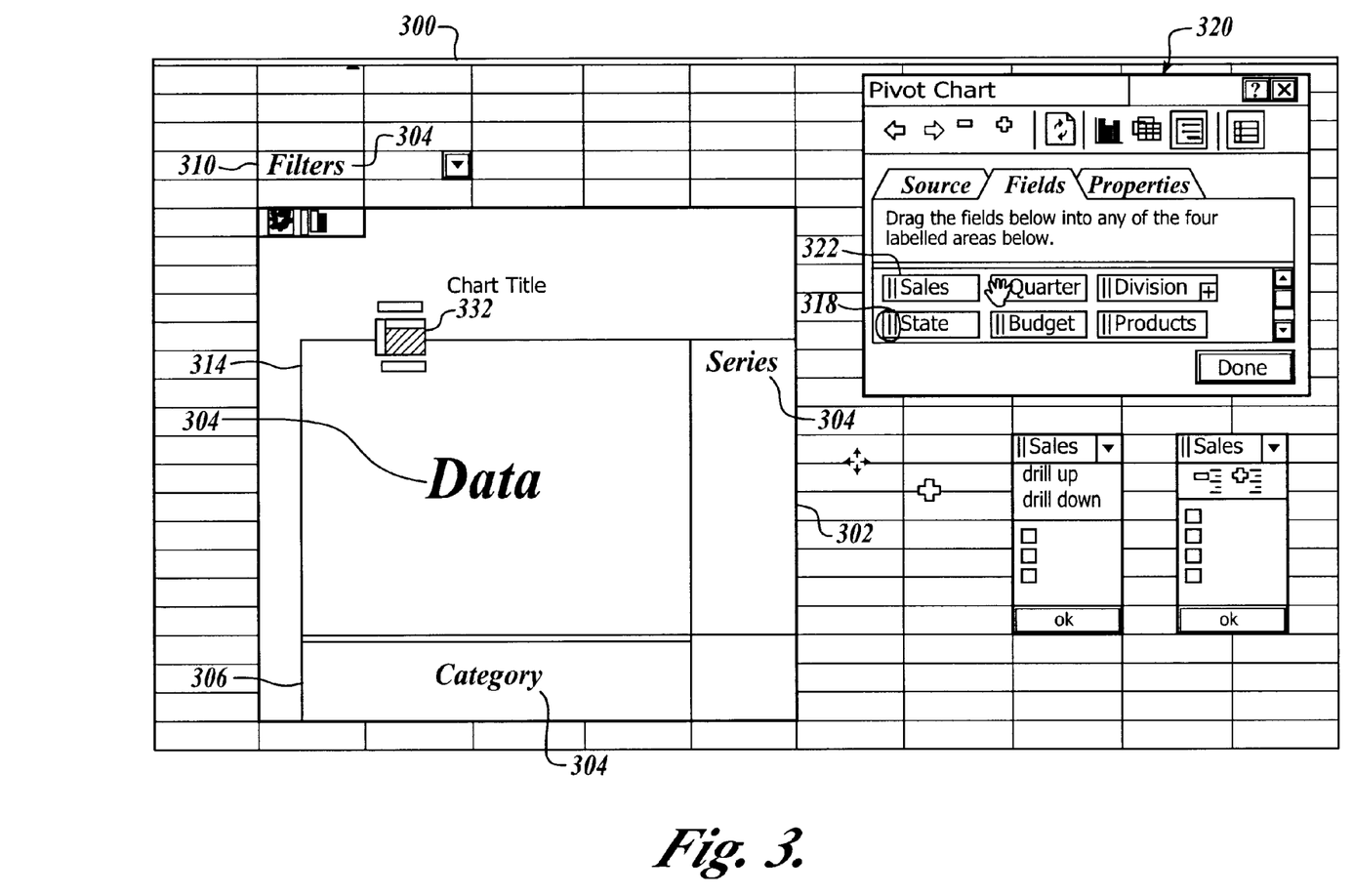
FIG. 3 is a screen display illustrating a graph template in accordance with an exemplary embodiment of the present invention.

Once a range of data fields 202 are selected for graphical display, an exemplary embodiment can display a graph template. Turning now to FIG. 3, an example of a graph template 300 is shown. The graph template 300 contains a series drop area 302, a category drop area 306, a page drop area 310, a data drop area 314, and a field list 320. Each of these elements will be discussed in turn.

The field list 320 contains a list of icons 322. Each icon corresponds to a data field 202. In an exemplary embodiment, a user may move an icon 322 and place, or "drop", it in the series drop area 302, the category drop area 306, the page drop area 310, or the data drop area 314. Dropping an icon 322 on any other portion of the graph template 300 results in the icon being returned to the field list 320.

A user may manipulate an icon 322 through the use of an input device, such as a mouse 42. Typically, a user performs a "drag and drop" operation by positioning the cursor 332 over the icon 322 that a user wishes to move, depressing the mouse 42 button, and moving the mouse while the mouse button is depressed. The icon 322 is dropped by releasing the mouse 42 button when the icon is positioned over the desired drop area. It will be apparent to those skilled in the art that icons may also be manipulated through the use of a keyboard 40, joystick, trackball, light pen, or another similar input device. This list is intended as a means of illustration rather than limitation. Other means for manipulating icons 322 may be used without departing from the spirit or scope of this description or the following claims.

Each icon 322 displayed in the field list 320 further contains an icon drop indicator 318. In an exemplary embodiment, the icon drop indicator 318 may appear as a set of parallel bars located in the left hand corner of the icon 322. If the icon drop indicator 318 is present, then the icon 322 may be dragged and dropped into one of the drop areas on the graph template 300. If an icon 322 has already been dropped in one of the drop areas, then the icon drop indicator 318 will not be present. Thus, the icon drop indicator 318 enhances the user feedback in an exemplary embodiment by indicating to a user what icons 322 have already been dropped in data fields, and which icons are still available for use.

In an exemplary embodiment, a graph template 300 has four drop areas: the series drop area 302; the category drop area 306; the page drop area 310; and the data drop area 314. As an icon 322 is dropped into one of the drop areas, the data field 202 and its attendant data points 204 are added to the graph template 300. This results in either creating or modifying a graphical display of a data field.

Dropping an icon 322 in the category drop area 306 of the graph template 300 of an exemplary embodiment places the data field 202 along the x-axis of the graph template. For example, placing the icon 322 corresponding to the Product Department data field 202 displayed in column A of FIG. 2 in the category drop area 306 of the graph template 300 would result in graphically displaying every data point 204 contained in column A along the x-axis of the graph template.

Dropping an icon 322 in the page drop area 310 allows a user of an exemplary embodiment to filter data shown on the graph template 300 by the data field 202 corresponding to the icon placed in the page drop area. A user of an exemplary embodiment may then filter the data displayed on a fully completed graph by selecting entries corresponding to the data points 204 of the data field 202 present in the page drop area. Turning briefly back to FIG. 2, an example will be provided. FIG. 2 displays a data field 202 in column D labeled "Time." Presuming that the Time data field has two possible entries, 1997 and 1998, a user of an exemplary embodiment may desire to see only the sales information corresponding to a particular year. If a user desires to filter data in this manner, the user may drop the icon 322 corresponding to the Time data field 202 in the page drop area 310. A user may then be presented with the option to view a data graph on a graph template 300 corresponding only to 1997 sales, 1998 sales, or to the sales from both years. Essentially, this creates separate "pages" on the graph template 300, each with a different set of data corresponding to the selected entry of the data field 202 and the page drop area 310.

Icons 322 placed in the data drop area 314 will be graphically displayed in the data portion of a completed graph 500. The data drop area 314 serves to receive icons 322 corresponding to data fields 202 that a user of an exemplary embodiment desires to graphically display. An exemplary graph will be discussed with respect to FIG. 5.

The graph template 300 further contains a series drop area 302. As icons 322 are dropped into the series drop area 302, data fields 202 graphically displayed in the data drop area 314 are subdivided according to the constituent data points 204 of the data field corresponding to the icon dropped into the series drop area. An illustrative example follows.

Figure 3A:
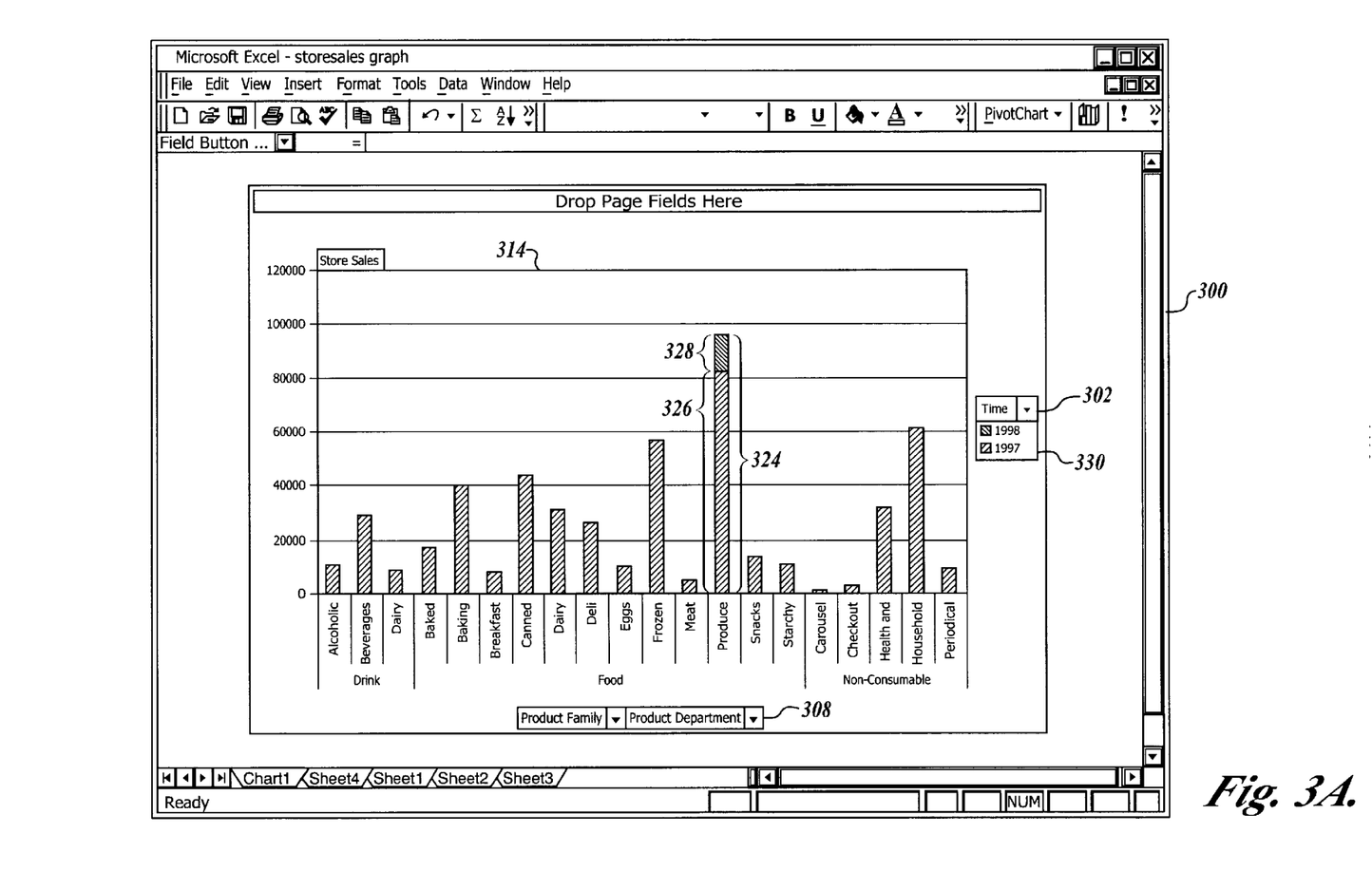
FIG. 3A is a screen display illustrating a graphical display of a data field in accordance with an exemplary embodiment of the present invention.

Turning flow to FIG. 3A, a sample graph template 300 may be seen. The Product Family and Product Department icons 322 have been dropped in the category drop area 306. As a result, the data points 204 corresponding to these data fields 202 are displayed along the x-axis. Similarly, the Stores Sales data fields 202 has been dropped in the data drop area 314, resulting in the data points 204 comprising the Store Sales data field being graphically displayed in the data drop area 314. It may further be seen that the Time data field 202 has been dropped in the series drop area 302. The placement of the Time data field 202 in the series drop area 302 subdivides the data points 204 comprising the Store Sales data field graphically displayed in the data drop area. The series display 330 shows all possible values for the data field placed in the series drop area. In the instant example, data points 204 comprising the Time data field 202 may have one or two values: 1998 or 1997. In an exemplary embodiment, the series display 330 may also indicate a color for each type of data point 204 graphed in the data drop area 314. These colors indicate which series of data points is shown in the data drop area.

To illustrate, the produce graphical display 324, it is apparent that the produce graphical display is comprised of two separate, differently colored elements. Referring back to the series display 330, it may be seen that the colored elements comprising the produce graphical display 324 correspond to series data points 202 "1997" and "1998". Therefore, the produce graphical display 324 is comprised of a 1997 produce graphical display 326 and a 1998 produce graphical display 328. Thus, a user of an exemplary embodiment examining the graph template 300 displayed in FIG. 3A may easily see not only a graphical display 324 of total produce sales for both years, but also a graphical display of 1997 produce sales 326 and a graphical display of 1998 produce sales 328. This breakout of graphically tabulated data by series allows a user to conveniently correlate an overall graph with constituent series elements.

Returning to FIG. 3, a watermark 304 may be seen in each of the drop areas. For example, the series drop area 302 contains a watermark 304 reading simply "series." Similarly, the category drop area 306 contains a "category" watermark 304. In an exemplary embodiment, the watermark 304 in each drop area may display the name of that drop area. These watermarks allow a user to quickly and easily identify the name of each drop area as well as its function. Once an icon 322 has been dropped in a drop area, the watermark 304 may be removed. Since the graph template 300 is updated to reflect the dropping of the icon 322 into a drop area, the function of the drop area will become immediately apparent and the watermark serves no further purpose.

In addition to the watermarks 304, the cursor 332 also provides user feedback. As the cursor passes over drop areas, it changes shape to alert a user of an exemplary embodiment as to the consequences of dropping an icon in the drop area over which the cursor 332 hovers. For example, FIG. 3 displays a cursor 332 hovering partially over the data drop area 314. The shape of the cursor 332 is changed in response to hovering over the data drop area 314 from an arrow to a rectangular shape consisting of four smaller rectangles. Each rectangle corresponds to a different drop area. As the cursor hovers over one of the drop areas, the rectangle corresponding to that drop area is shaded on the cursor 332. Continuing the example of FIG. 3, the large bottom right-hand-corner box is shaded. This indicates that the cursor is hovering above the data drop area 314. If the cursor were to hover above the series drop area 302, the leftmost rectangle of the cursor 332 would be shaded. Similarly, were the cursor to hover above the category drop area 306, the middle rectangle would be shaded, and were the cursor to hover above the page drop area, the topmost rectangle would be shaded. The locations of the rectangles comprising the shape of the cursor 332 as it hovers over a drop area were chosen in order to reflect the approximate positions of those drop areas on the graph template 300. Thus, a user may easily and quickly determine over which drop area the cursor 332 is positioned by examining which of the rectangles within the cursor is shaded. This enhanced user feedback allows a user of a exemplary embodiment to more quickly, easily, and efficiently create a graphical display of a set of data fields 202.

Figure 4A:
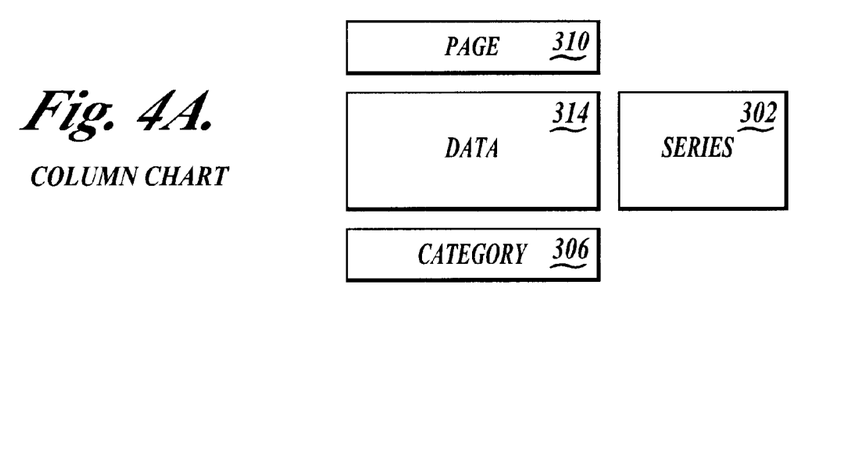
FIG. 4A is a diagram showing the layout of drop areas for a column column graph template in accordance with an exemplary embodiment of the present invention.
Figure 4B:
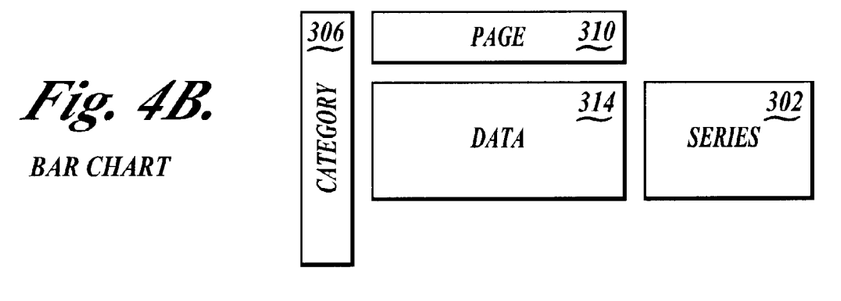
FIG. 4B is a diagram showing the layout of drop areas for a bar column graph template in accordance with an exemplary embodiment of the present invention.
Figure 4C:
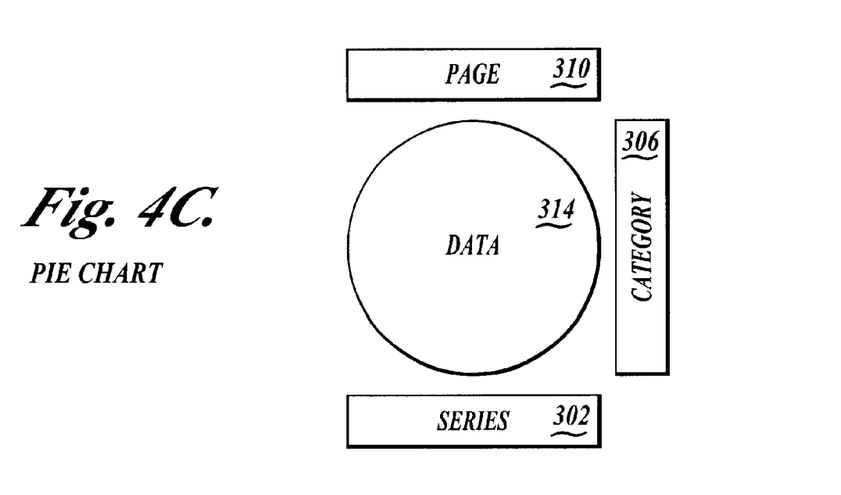
FIG. 4C is a diagram showing the layout of drop areas for a pie column graph template in accordance with an exemplary embodiment of the present invention.

FIGS. 4A, 4B, and 4C display varying placements of the drop areas according to the style of graph template 300 selected. In FIG. 4A, the drop area layout for a column column graph template 300 is displayed. When creating a column chart, the series drop area 302 is positioned to the right of the data drop area 314, while the category drop area 306 and the page drop area 310 are positioned below and above the data drop area respectively. In an exemplary embodiment, the column chart layout comprises the default graph template 300.

However, a user may elect to create a different type of graph. In this case, the layout of the graph template 300 depends on what type of alternate graph is chosen. FIG. 4B displays a layout of the graph template 300 for a bar chart. When creating a bar chart, the series drop area 302 is again located to the right of the data drop area 314. Similarly, the page drop area 310 is again located above the data drop area 314. However, unlike the layout of the graph template 300 when creating a column chart, the category drop area 306 is located to the left of the data drop area 314 rather than beneath it.

Finally, a user may opt to create a pie chart. FIG. 4C displays the layout of the graph template 300 in this event. Here not only are the layouts of the drop areas changed, but the shape of several of the drop areas vary as well. The data drop area is circular, rather than rectangular. This reflects the fact that a pie chart, unlike a column chart or a bar chart, is round. Although the page drop area 310 is still located above the data drop area 314, the positions of the category drop area 306 and the series drop area 302 are changed. The category drop area 306 is located to the right of the data drop area 314. The series drop area 302 is located beneath the data drop area 314. Further, the series drop area has less height than it does in the graph template 300 for either a column chart or a bar chart. Essentially, when creating a pie chart, the positions of the category drop area 306 and the series drop area 302 are reversed from their respective positions in the column column graph template 300 shown in FIG. 4A.

In addition to allowing a user to create multiple styles of graphs, an exemplary embodiment may also allow a user to change between graph styles during creation or viewing of a graph, or "on the fly." Oftentimes, a user may desire to view a completed or partially completed graph in a different format. An exemplary embodiment may allow a user to take such a graph and alter its style without recreating the graph on a new graph template 300. Instead of forcing a user to regraph data fields 202 by dropping icons 322 into drop areas, a user of an exemplary embodiment may simply select a new graph style from a menu. The exemplary embodiment then not only updates the position of the drop areas in the graph template 300, but also regraphs the data fields 202 as well. Allowing a user to switch between graph templates 300 on the fly is advantageous in that it saves valuable user time and effort that would otherwise be directed to regraphing data fields 202.

Figure 5:
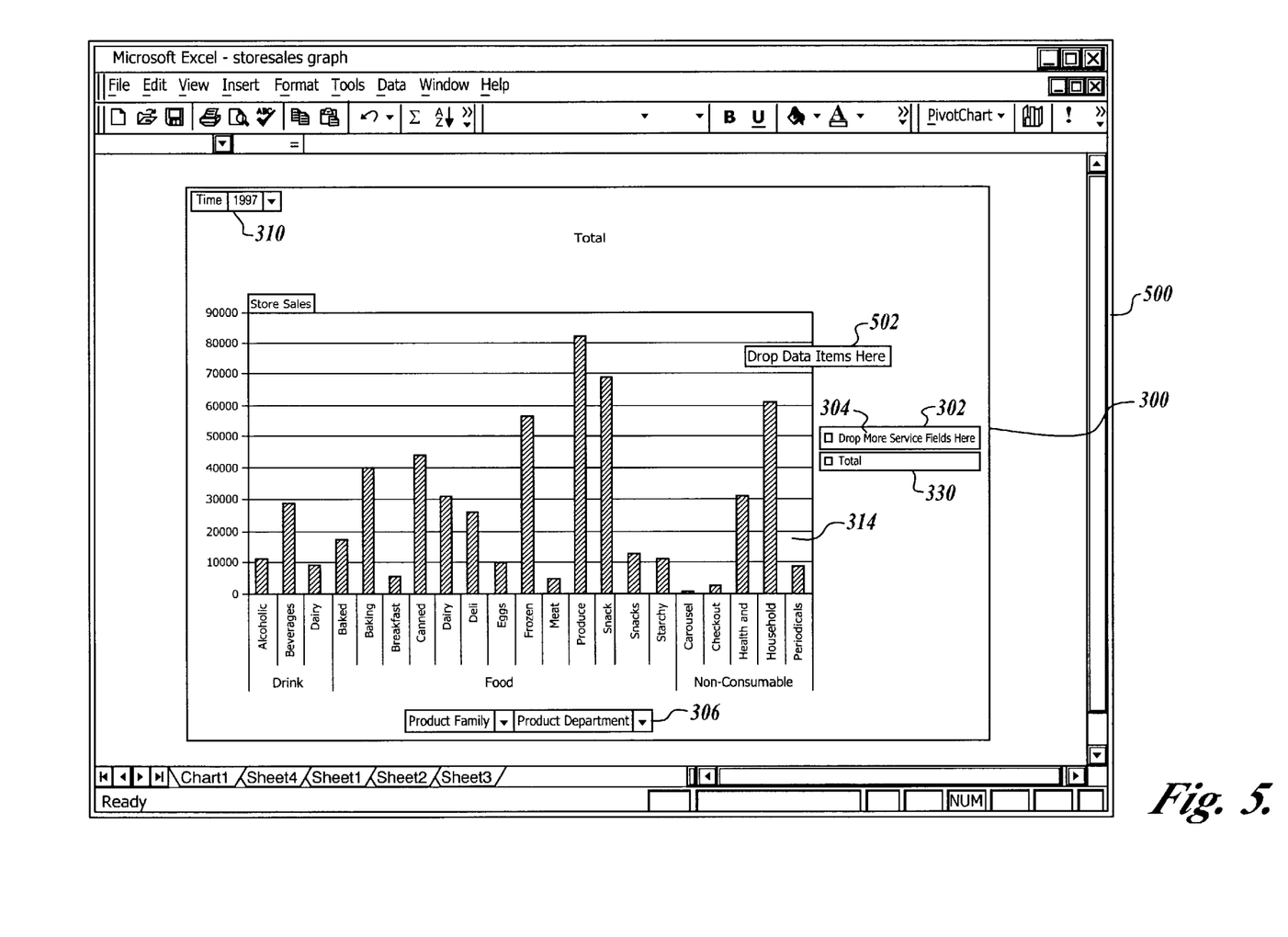
FIG. 5 is a screen display illustrating a graphical display of a data field in accordance with an exemplary embodiment of the present invention.

FIG. 5 displays an exemplary graph window 500 containing an exemplary completed graph based on the data fields 202 shown in FIG. 2, and displayed on the graph template discussed with respect to FIG. 3. The graph template displayed in the exemplary graph window 500 is a column graph. Since no icons 322 have been dropped in the series drop area 302, the watermark 304 is still present. Further, because no icons 322 have been dropped in the series drop area 302, the only entry in the series display 330 reads "Total." This signifies that the data points 204 corresponding to the data fields 202 displayed in the data drop area 314 are aggregate totals, rather than being broken out by series. Breaking out graphs by series is more fully discussed with respect to FIG. 3A.

Two icons 322 have been dropped in the category drop area 306. These icons represent the Product Family and Product Department data fields 202. It can be seen that there are two sets of entries along the x-axis of the graph template 300 displayed in the exemplary graph window 500. One set of entries, corresponding to the Product Department data field 202, has twenty-one entries ranging from "Alcoholic" to "Periodicals." These are the individual data fields 202 for which store sales are graphed in the data drop area 314. The second set of entries corresponds to the Product Family data field 202. There are three possible values for data points 204 in the Product Family data field: Drink, Food, and Non-Consumable. Because there are two separate data fields 202 within the category drop area 306, one data field is necessarily nested within the other. In the example of FIG. 5, the Product Department data field 202 is nested within the Product Family data field. That is, while all twenty-one individual data points 204 of the Product Department data field are listed on the x-axis of the exemplary graph window 500, they are grouped according to the type of Product Family to which each belongs. For example, the Alcoholic, Beverages, and Dairy Product Departments are parts of the Drink Product Family.

A user may wish to place more than one field on the x-axis in order to see one data field 202 broken out in terms of a second data field. In the current example, a user may have determined that simply graphing all store sales in terms of Drink, Food, and Non-consumable items is insufficiently detailed. However, a user may still be interested in these broad categories in order to determine which of the three is most profitable. Therefore, it becomes necessary for the user to view each Product Department broken out by Product Family. In order to permit such an in-depth view of data, an exemplary embodiment may permit the placement of more than one data field 202 on an axis. Typically, the leftmost data field 202 displayed in the category drop area 306 corresponds to the data field by which the data field immediately to the right is broken out. It is possible to nest multiple data fields 202 in this manner.

Continuing with the example of FIG. 5, tooltip 502 is shown. The tooltip 502 appears when the cursor 332 is positioned proximate to over a drop area. The tooltip provides a level of user feedback beyond that given by changing the shape of the cursor 332. Typically, the tooltip 502 explains the consequences of dropping an icon 322 in a specific drop area. In the current example, the tooltip 502 indicates that any icons 322 dropped in the data drop area 314 will become data items by displaying the text "Drop Data Items Here." Similar tooltips exists for the other drop areas. In addition to appearing when the cursor 332 is positioned proximate to a data field, the tooltip will follow the motion of the cursor.

While the tooltip 502 follows the motion of the cursor 332, it disappears from the display screen 47 in the event that the cursor exceeds the boundaries of the drop area over which it was positioned. This is done in order to ensure that only proper user feedback is given, rather than indicating to a user that an icon may be dropped beyond the boundaries of a drop area and still be incorporated into the drop area.

Figure 6:
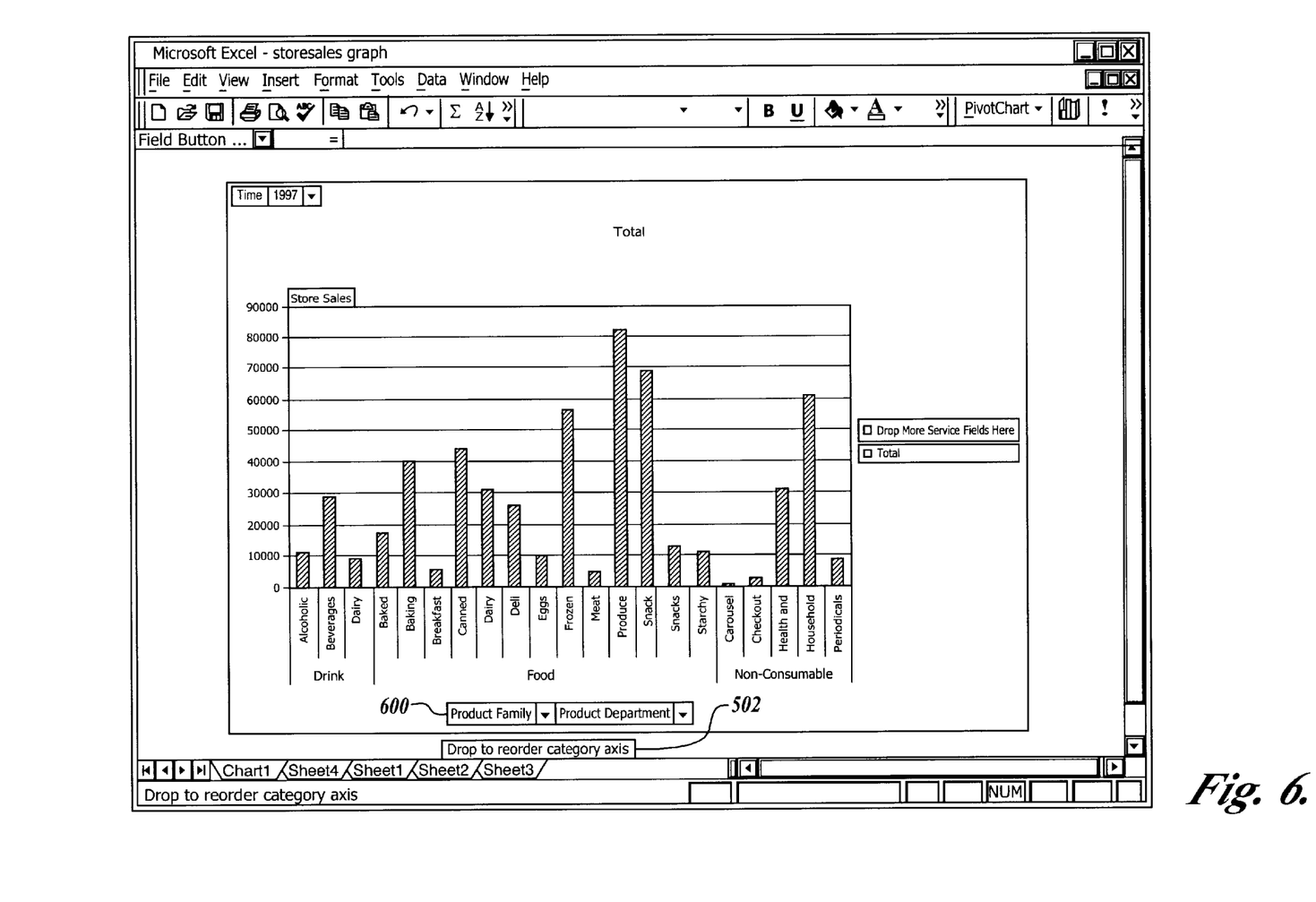
FIG. 6 is a screen display illustrating the initial steps in reordering data along a graph axis in accordance with an exemplary embodiment of the present invention.
Figure 7:
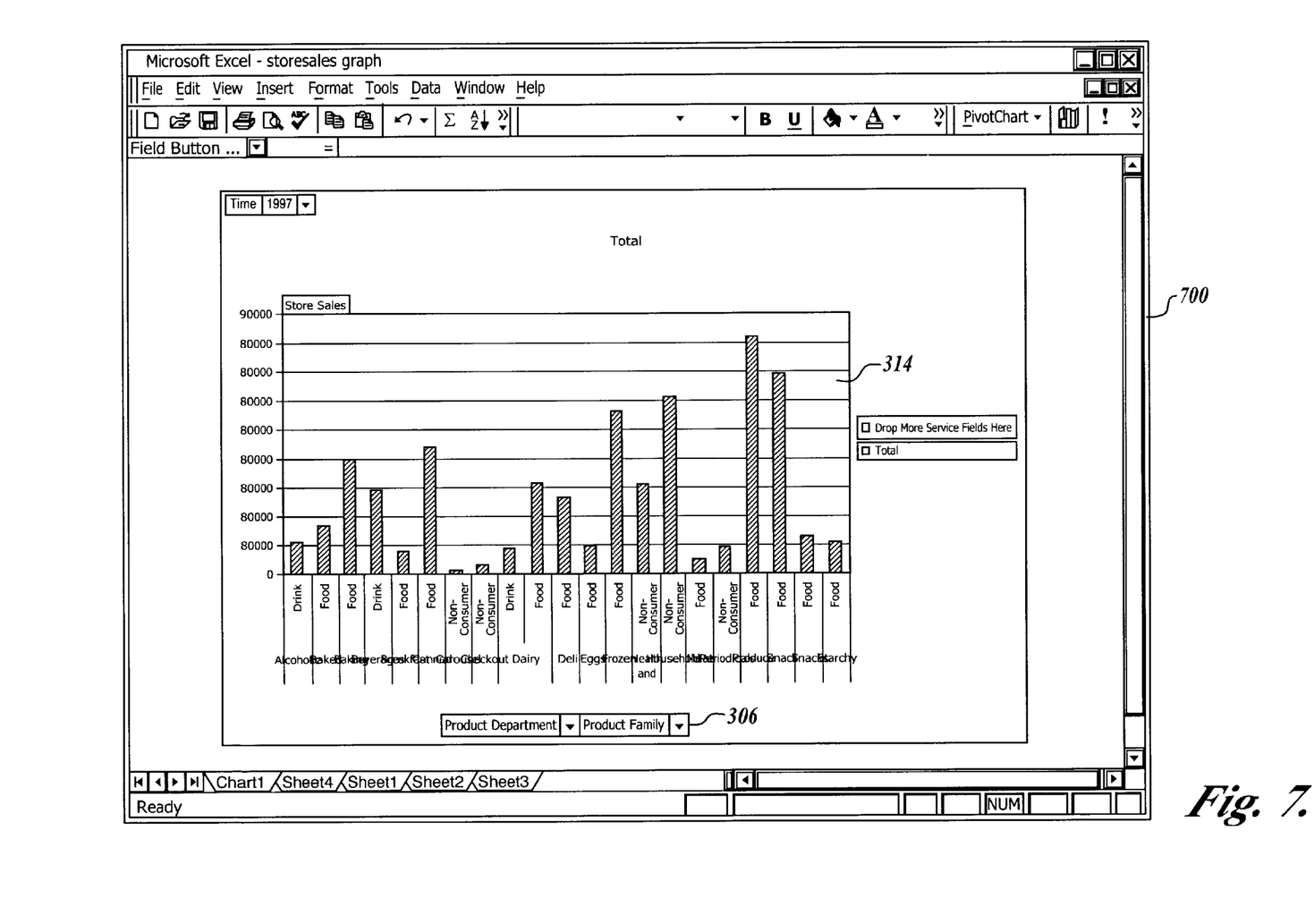
FIG. 7 is a screen display illustrating a graphical display of a data field where the data fields have been reordered along the category axis in accordance with an exemplary embodiment of the present invention.

As previously discussed, a user may nest one data field 202 within another in either the category drop area 306 or the series drop area 302 in order to view various data breakouts. An exemplary embodiment may further allow a user to reorder these data fields within the series drop area or the category drop area. This allows a user to view different graphical permutations of the same set of data without requiring the user to redisplay the data on a new graph template 300. FIGS. 6 and 7 display this process.

Turning now to FIG. 6, the initial steps in reordering data fields 202 within the category drop area 306 may be seen. In an exemplary embodiment, a user first selects an icon 322 within the category drop area 306 corresponding to the data field 202 which he wishes to move. As the icon is moved within the category drop area, the cursor 332 assumes an I-bar shape 600 in order to indicate where the icon will be placed if it is dropped. Further user feedback is provided by the appearance of a tooltip 502 stating, "Drop to reorder category axis." The combination of these two features allows an exemplary embodiment to indicate the consequences of reordering an icon 322 within either the category drop area 306 or the series drop area 302.

FIG. 7 displays a graph within a reordered graph window 700. While the data fields 202 and data points 204 are identical to those displayed in FIG. 5, the Product Department and Product Family data fields have been reordered within the category drop area 306. Thus, instead of breaking out each product department by its product family (for example, showing Alcoholic, Beverages, and Dairy as sub-categories of Drink), now the Product Family data field 202 is broken out by the Product Department data field. Thus, a user may take multiple views of the same set of data fields 202 without going through the process of creating a new graphical display on a new graph template 300.

Figure 8:
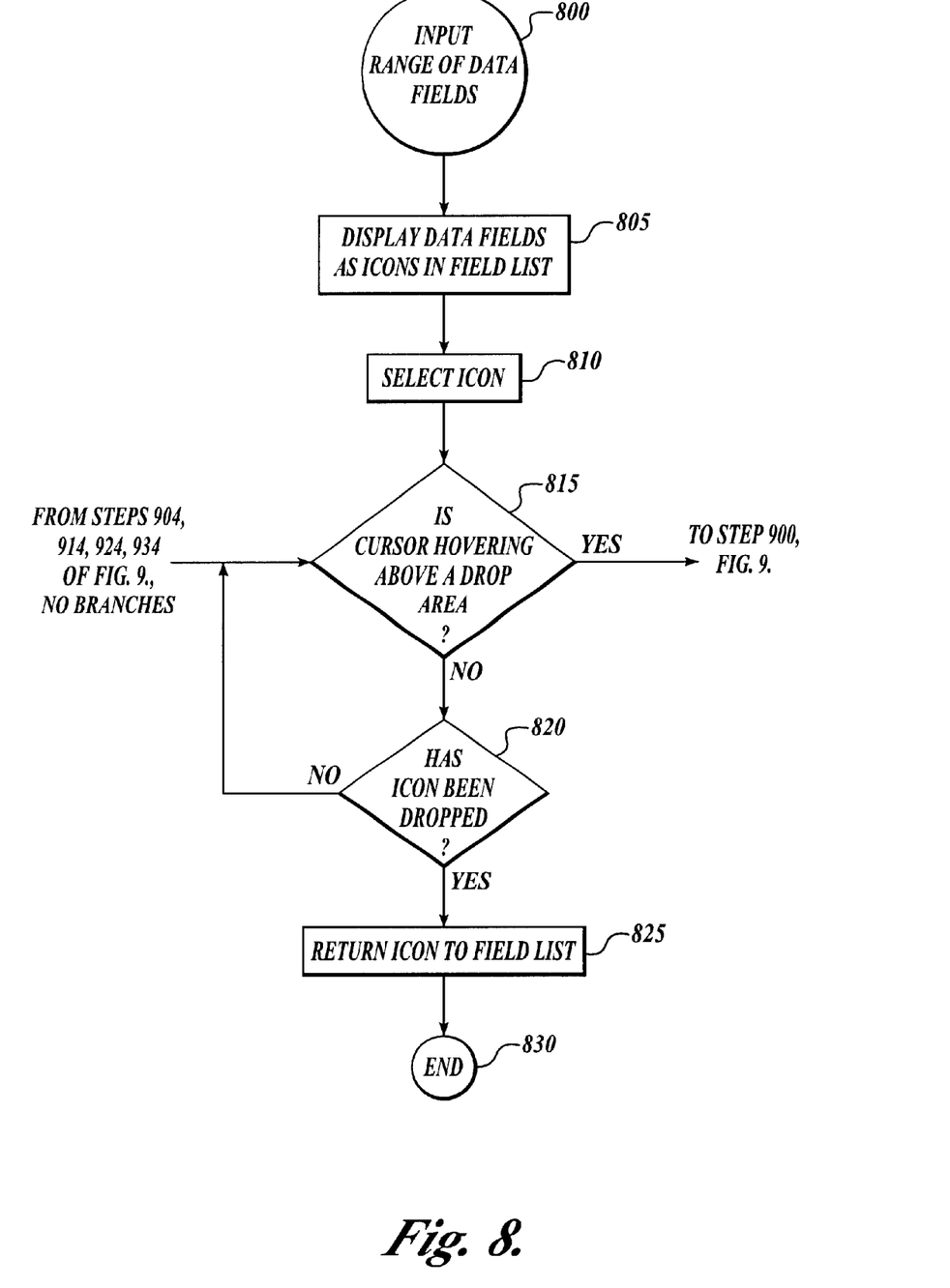
FIG. 8 is a flowchart illustrating a method for creating a graphical display of data fields in accordance with an exemplary embodiment of the present invention.
Figure 9:
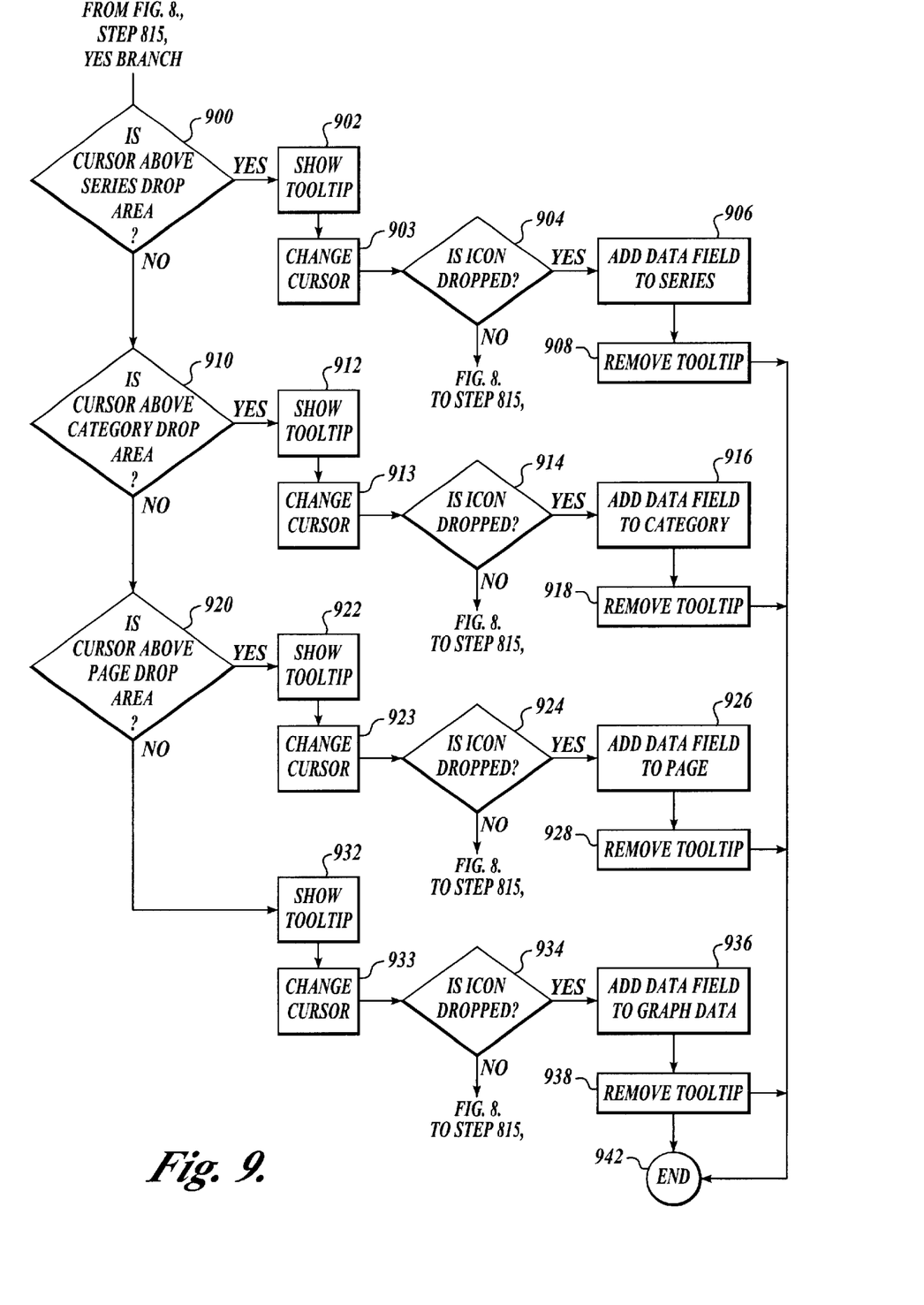
FIG. 9 is a continuation of the flowchart of FIG. 8, further illustrating a method for creating a graphical display of data fields in accordance with an exemplary embodiment of the present invention.

FIGS. 8 and 9 depict flowcharts detailing the steps taken by an exemplary embodiment operating in the exemplary operating environment in order to graphically display data fields 202 within a graph template 300. The flowchart begins with step 800 on FIG. 8. In step 800, a range of data fields to be graphically displayed is inputted. After the data fields are determined, step 805 is entered.

In step 805, the data fields inputted in step 800 are displayed as icons 322 in a field list 320. Next, an icon is selected in step 810. Typically, an icon 322 may be selected through the use of an input device, such as a mouse 42, by positioning a cursor 332 over the desired icon located in the field list 320, depressing a mouse button, and moving the mouse while keeping the mouse button depressed. Other input devices may also be used for the selection of an icon in step 810, such as a keyboard 40, trackball, light pen, joystick, microphone, and others that will occur to those skilled in the art. These examples are offered by way of illustration rather than limitation. Alternative input devices may be used without departing from the spirit or letter of this invention. Once an icon 322 has been selected, the icon may be freely moved about the screen until a "drop" command is initiated. After step 810 is executed, decision step 815 is entered.

A determination is made in step 815 whether the cursor is positioned proximate to a drop area. If so, then step 900 of FIG. 9 is accessed. Generally, FIG. 9 deals with the addition of an icon 322 to a drop area and the resulting graphical display of the data field 202 associated with that icon. A detailed discussion of FIG. 9 follows this discussion of FIG. 8.

If it is determined in decision step 815 that the cursor is not positioned proximate to a drop area, then in step 820 it must be determined if the icon 322 selected in step 810 has been dropped. Typically, an icon is dropped by releasing the mouse 42 button depressed in step 805. Releasing the mouse button indicates that a user no longer wishes to drag or otherwise manipulate the selected icon 322, but instead wishes to place it on the area of the screen over which the cursor 332 currently is positioned. Again, an icon 322 may be dropped in other ways apparent to those skilled in the art, such as the initiation of a drop signal through the use of an input device such as a keyboard 40. These alternatives are fully embraced by this specification and the claims that follow.

If the icon 322 is not dropped in step 820, then step 815 is once again accessed to determine whether the cursor is positioned proximate to a drop area. This loop is repeated as quickly as the exemplary operating environment allows in order to repeatedly poll for the presence of the cursor 332 over a drop area, or alternately the dropping of the icon 322.

However, in the event that it is determined in step 820 that the icon 322 is dropped, then step 825 is accessed. In step 825, the icon 322 is returned to the field list 320. The icon is replaced in the field list in step 825 because it was placed on a portion of the graph template 300 other than a designated drop area; that is, the icon was dropped over a section of the graph template that does not accept or allow for the manipulation of icons. In this event, the placement of the icon 322 does not result in the graphical display of any data fields 202 on the graph template 300. Instead, the icon 322 is returned to the field list 320 in order to allow a user to reselect and place it in one of the drop areas provided on the graph template. Once the icon is returned to the field list 320 in step 825, end state 830 is accessed.

FIG. 9 displays the portion of the flowchart entered if it is determined in step 815 of FIG. 8 that the cursor is hovering above a drop area. From step 815, step 900 of FIG. 9 is entered. In step 900, it is determined whether the cursor 332 is hovering above the series drop area 302. If this decision yields a positive result, then step 902 is entered. In step 902, the tooltip 502 corresponding to the series drop area 302 is displayed. Typically, this tooltip reads "Drop series fields here." The tooltip 502 gives the user valuable feedback describing the consequences of dropping the icon 322 in this particular drop area; namely, that the data field 202 associated with the icon will be added to the series drop area 302.

Once step 920 is executed, step 903 is initiated. In step 903, the shape of the cursor is changed to a representation of a graph template 300. As a further element of user feedback, the portion of the changed cursor corresponding to the drop area over which the cursor is positioned is shaded. This informs the user which drop area an icon will be added to if it is dropped at this point. In step 903, the shaded portion of the cursor 332 is the leftmost rectangle, signifying that the cursor is positioned over the series drop area 302.

Following step 903, it must be decided in step 904 whether the icon 322 has been dropped in the series drop area 302. If not, then step 815 of FIG. 8 is entered. This is done in order to reflect the fact that a user may be dragging an icon 322 across the series drop area 302 in order to reach another portion of the graph template 300, such as the data drop area 314. In this example, it must be continuously reevaluated whether the cursor remains over the series drop area 302, has passed into an intermediate portion of the graph template 300, or is now in the data drop area 314. This continuous poll is implemented by returning to step 815 of FIG. 8 and stepping through the decision logic again.

Alternatively, it may be determined in step 904 that the icon 322 has been dropped in the series drop area 302. If so, step 906 is accessed and the data field 202 represented by the icon 322 is added to the series drop area 302. This results in the graphical display of the data field in the series drop area, as well as the subdivision of any data graphically displayed in the data drop area 314. This subdivision of data was more fully discussed with respect to FIG. 3A.

Following step 906, the tooltip 502 is removed from the display screen 47 in step 908. Finally, end step 942 is accessed.

However, it may be determined in step 900 that the cursor 332 is not positioned above the series drop area 302. In this event, decision step 910 is entered and a determination is made whether the cursor 332 is currently positioned above the category drop area 306.

If this decision yields a positive result, then step 912 is entered. In step 912, the tooltip 502 corresponding to the category drop area 306 is displayed. Typically, this tooltip reads "Drop category fields here." The tooltip 502 gives the user valuable feedback describing the consequences of dropping the icon 322 in this particular drop area; namely, that the data field 202 associated with the icon will be added to the category drop area 306.

Once step 912 is executed, step 913 is initiated. In step 913, the shape of the cursor is changed to a representation of a graph template 300. As a further element of user feedback, the portion of the changed cursor corresponding to the drop area over which the cursor is positioned is shaded. This informs the user which drop area an icon will be added to if it is dropped at this point. In step 913, the shaded portion of the cursor 332 is the middle rectangle, signifying that the cursor is positioned over the category drop area 306.

Following step 913, it must be decided in step 914 whether the icon 322 has been dropped in the category drop area 306. If not, then step 815 of FIG. 8 is entered.

Alternately, it may be determined in step 914 that the icon 322 has, been dropped in the category drop area 306. If so, step 916 is accessed and the data field 202 represented by the icon 322 is added to the category drop area 306. This results in the graphical display of the data field in the category drop area, as well as the regraphing of any data graphically displayed in the data drop area 314.

Following step 916, the tooltip 502 is removed from the display screen 47 in step 918. Finally, end step 942 is accessed.

It may be determined in step 910 that the cursor 332 is not positioned above the category drop area 306. In this event, decision step 920 is entered and a determination is made whether the cursor 332 is currently positioned above the page drop area 310.

If this decision yields a positive result, then step 922 is entered. In step 922, the tooltip 502 corresponding to the page drop area 310 is displayed. Typically, this tooltip reads "Drop page fields here." The tooltip 502 gives the user valuable feedback describing the consequences of dropping the icon 322 in this particular drop area; namely, that the data field 202 associated with the icon will be added to the page drop area 310.

Once step 922 is executed, step 923 is initiated. In step 923, the shape of the cursor is changed to a representation of a graph template 300. As a further element of user feedback, the portion of the changed cursor corresponding to the drop area over which the cursor is positioned is shaded. This informs the user which drop area an icon will be added to if it is dropped at this point. In step 923, the shaded portion of the cursor 332 is the topmost rectangle, signifying that the cursor is positioned over the page drop area 310.

Following step 923, it must be decided in step 924 whether the icon 322 has been dropped in the page drop area 310. If not, then step 815 of FIG. 8 is entered.

Alternatively, it may be determined in step 924 that the icon 322 has been dropped in the page drop area 310. If so, step 926 is accessed and the data field 202 represented by the icon 322 is added to the page drop area 310. This results in the graphical display of the data field associated with the drop icon in the page drop area, as well as the subdivision of any data graphically displayed in the data drop area 314. This subdivision of data into separate pages was more fully discussed with respect to FIG. 3.

Following step 926, the tooltip 502 is removed from the display screen 47 in step 928. Finally, end step 942 is accessed.

In the event that it is determined in step 920 that the cursor 332 is not hovering above the page drop area 310, then step 932 is entered. In step 932, the tooltip 502 corresponding to the data drop area 314 is a displayed. Typically, this tooltip reads "Drop data fields here." The tooltip 502 gives the user valuable feedback describing the consequences of dropping the icon 322 in this particular drop area; namely, that the data field 202 associated with the icon will be added to the data drop area 314.

Once step 922 is executed, step 933 is initiated. In step 933, the shape of the cursor is changed to a representation of a graph template 300. In order to provide additional user feedback, the portion of the changed cursor corresponding to the drop area over which the cursor is positioned is shaded.

This informs the user which drop area an icon will be added to if it is dropped at this point. In step 933, the shaded portion of the cursor 332 is the bottom right rectangle, signifying that the cursor is positioned over the data drop area 314.

Following step 933, it must be decided in step 934 whether the icon 322 has been dropped in the data drop area 314. If not, then step 815 of FIG. 8 is entered for the reasons discussed above with respect to step 904.

Alternatively, it may be determined in step 934 that the icon 322 has been dropped in the data drop area 314. If so, step 936 is accessed and the data field 202 represented by the icon 322 is added to the data drop area 314. This results in the graphical display of the data field associated with the dropped icon in the data drop area, as discussed with respect to FIG. 3.

Next, in step 938 the tooltip 502 is removed. Following the removal of the tooltip in step 938, end state 942 is accessed.

Conclusion

From the foregoing description, it will be appreciated that an exemplary embodiment supports a method for graphically displaying data fields. Specifically, an exemplary embodiment allows a user to select a range of data points grouped into data fields, choose a graph template, and graphically display the data fields of his choice through manipulating icons representing those data fields within the drop areas of the graph template. As a result, the user may more conveniently access and manipulate information stored in a database format.

The invention may conveniently be implemented in one or more program modules that are based upon the flowcharts of FIGS. 8 and 9 and the features illustrated in FIGS. 2–7. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

Although an exemplary embodiment was described using a spreadsheet database as the exemplary program, those skilled in the art will appreciate that an exemplary embodiment is not limited to this arrangement, but may include any means of accessing a set of data fields and manipulating those data fields. For example, the display of a spreadsheet on a web browser in HTML is embraced by the spirit of an exemplary embodiment. Further, although the term "spreadsheet" has been used throughout this document, an exemplary embodiment may manipulate any form of database or data fields. Further, although an exemplary embodiment was described using a mouse as the input device, those skilled in the art will appreciate that an exemplary embodiment is not limited to this arrangement, but may include multiple forms of input devices, such as trackballs, keyboards, light pens, joysticks, and so forth.

Alternative embodiments will become apparent to those skilled in the art to which an exemplary embodiment pertains without departing from its spirit and scope. Accordingly, the scope of an exemplary embodiment is defined by the appended claims rather than the foregoing description.

We claim:

1. A method for graphically representing a set of data fields, comprising:

displaying a plurality of icons on a display screen, the icons corresponding to the data fields;

providing on the display screen a data drop area and a non-data drop area to which the icons may be dragged, wherein the non-data drop area is selected from a group consisting of a series drop area, a category drop area, and a page drop area, and wherein the data drop area and the non-data drop area correspond to a portion of a graph template;

dragging a certain one of the icons to a selected one of the provided drop areas;

dropping the certain icon in the selected provided drop area; and displaying in graphical format on the display screen the data field corresponding to the certain icon in the portion of the graph template corresponding to the selected provided drop area.

2. The method of claim 1, further comprising:

selecting one of a plurality of graph templates; and rearranging the graphically displayed data field according to the selected graph template.

3. The method of claim 2, wherein the position of the drop areas on the display screen varies according to the selected graph template.

4. The method of claim 1, wherein a watermark stating the function of the drop area is displayed within the drop area.

5. The method of claim 4, wherein the watermark displays the name of the drop area.

6. The method of claim 4, further comprising removing the watermark from the drop area in response to dropping the certain icon in the drop area.

7. A computer-implemented method for creating a computer database graph, comprising:

selecting a plurality of data fields from a database, each data field comprising a plurality of data points;

displaying a graph template comprising a series drop area, a category drop area, a data drop area, a page drop area, and a field list;

displaying in the field list a plurality of icons corresponding to the data fields;

receiving a first indication signal that a one of the icons has been selected;

in response to receiving the first indication signal, permitting the selected icon to be moved from the field list;

receiving a second indication signal that the selected icon has been moved to a certain one of the series, category, page, or data drop areas;

in response to receiving the second indication signal, displaying the data field corresponding to the selected icon in graphical format within a certain one of the series drop area, an axis of the graph template, the page drop area, or the data drop area.

8. The computer-implemented method of claim 7, wherein the graph template is chosen from a group comprising a bar graph, a pie graph, and a column graph.

9. The computer-implemented method of claim 7, further comprising:

receiving a third indication signal that another graph template has been selected; and in response to receiving the third indication signal, changing the positions and shapes of the data fields displayed on the selected graph template.

10. The computer-implemented method of claim 7, further comprising:
receiving a third indication signal that a cursor is positioned proximate to a portion of the graph template; and
in response to receiving the third indication signal, displaying on a display screen text proximate to the cursor indicating the features of the portion of the graph template.

11. The computer-implemented method of claim 10, further comprising:
moving the cursor;
moving the text to follow the cursor;
receiving a fourth indication signal that a cursor has moved beyond the portion of the graph template; and
in response to receiving the fourth indication signal, removing the text from the display screen.

12. The computer-implemented method of claim 7, wherein the series drop area, category drop area, data drop area, and page drop area contain text designating the name of each area.

13. The computer-implemented method of claim 7, further comprising ordering the data points graphically displayed in the data drop area according to the order of the data fields displayed in the series and category drop areas.

14. The method of claim 13, further comprising:
displaying the names of the data fields corresponding to the icons dropped in the category drop area in a row;
receiving an indication signal that one of the names of the data fields has been moved;
in response to receiving an indication signal that one of the names of the data fields has been moved, displaying a marker indicating the position of the name;
receiving an indication signal that the name of the data field has been reordered;
in response to receiving the indication signal that the name of the data field has been reordered, placing the name in the row at the position corresponding to the marker; and
reordering the data points displayed in the data drop area according to the new arrangement of data fields displayed in the category drop area.

15. The method of claim 13, further comprising:
displaying the names of the data fields corresponding to the icons dropped in the series drop area in a column;
receiving an indication signal that one of the names of the data fields has been moved;
in response to receiving an indication signal that one of the names of the data fields has been moved, displaying a marker indicating the position of the name;
receiving an indication signal that the name of the data field has been reordered;
in response to receiving the indication signal that the name of the data field has been dropped, placing the name in the column at the position corresponding to the marker; and
reordering the data fields displayed in the data drop area according to the new arrangement of data fields displayed in the series drop area.

16. A computer-readable medium on which is stored a program module for creating a database graph, the program module comprising instructions which, when executed by a computer, perform the steps of:
selecting a plurality of data fields from a database, each data field comprising a plurality of data points;
displaying a graph template comprising a series drop area, a category drop area, a data drop area, a page drop area, and a field list;
displaying in the field list a plurality of icons corresponding to the data fields;
receiving a first indication signal that an icon has been selected through the use of a cursor;
in response to receiving the first indication signal, permitting the selected icon to be moved from the field list;
receiving a second indication signal that the selected icon and cursor have been positioned proximate to the series, category, page, or data drop areas;
in response to receiving the second indication signal, displaying text on a display screen indicating the features of the portion of the graph template;
receiving a third indication signal that the selected icon has been dropped in a certain one of the series, category, page, or data drop areas; and
in response to receiving the third indication signal, displaying the data field corresponding to the selected icon in graphical format within a certain one of the series drop area, an axis of the graph template, the page drop area, or the data drop area.

17. The computer-readable medium of claim 16, further comprising:
receiving a fourth indication signal that the cursor has moved;
in response to receiving the fourth indication signal, tracking the movement of the cursor with the help text;
receiving a fifth indication signal that the cursor is no longer positioned proximate to a certain one of the series, category, page, or data drop areas; and
in response to receiving the fifth indication signal, removing the text from the display screen.

18. The computer-readable medium of claim 16, further comprising:
receiving an indication that the cursor is positioned proximate to the series drop area;
in response to receiving the indication that the cursor is positioned proximate to the series drop area, changing the shape of a cursor to that of a column chart with four divisions, the leftmost division highlighted;
receiving an indication that the cursor is hovering over the category drop area;
in response to receiving the indication that a cursor is positioned proximate to the category drop area, changing the shape of the cursor to that of a column chart with four divisions, the bottommost division highlighted;
receiving an indication that a cursor is positioned proximate to the page drop area;
in response to receiving the indication that a cursor is positioned proximate to the page drop area, changing the shape of the cursor to that of a column chart with four divisions, the topmost division highlighted;
receiving an indication that a cursor is is positioned proximate to the data drop area; and
in response to receiving the indication that a cursor is positioned proximate to the data drop area, changing the shape of the cursor to that of a column chart with four divisions, the middle division highlighted.

19. The computer-readable medium of claim 16, wherein the positions of the series drop area, the category drop area, the data drop area, and the page drop area vary according to which of a plurality of graph templates is selected.

20. The computer-readable medium of claim 16, wherein the data points graphically displayed in the data drop area are ordered according to the order of the data fields graphically displayed in the series drop area and the category drop area.

21. The computer-readable medium of claim 16, further comprising:

displaying the data fields in the category drop area in a row;

receiving a third indication signal that one of the data fields displayed in the category drop area has been moved to another portion of the row;

in response to receiving the third indication signal, reordering the data fields in the row to accommodate the movement of the moved data field; and reordering the graphical display of the data points in the data drop area according to the new order of the data fields displayed in the row.

22. The computer-readable medium of claim 16, wherein the field list contains an indicator operative to indicate whether an icon has been placed in a drop area.

* * * * *